(12) United States Patent
Gaefke et al.

(10) Patent No.: US 9,994,655 B2
(45) Date of Patent: Jun. 12, 2018

(54) RESIN MIXTURE BASED ON EPOXY(METH)ACRYLATE RESIN, AND THE USE THEREOF

(71) Applicant: HILTI AKTIENGESELLSCHAFT, Schaan (LI)

(72) Inventors: Gerald Gaefke, Augsburg (DE); Thomas Burgel, Landsberg am Lech (DE); Michael Leitner, Landsberg (DE)

(73) Assignee: HILTI AKTIENGESELLSCHAFT, Schaan (LI)

( * ) Notice: Subject to any disclaimer, the term of this patent is extended or adjusted under 35 U.S.C. 154(b) by 0 days. days.

(21) Appl. No.: 14/718,896

(22) Filed: May 21, 2015

(65) Prior Publication Data

US 2015/0252124 A1  Sep. 10, 2015

Related U.S. Application Data

(63) Continuation of application No. PCT/EP2013/074227, filed on Nov. 20, 2013.

(30) Foreign Application Priority Data

Nov. 23, 2012  (DE) ........................ 10 2012 221 446

(51) Int. Cl.
| | |
|---|---|
| *C08F 122/00* | (2006.01) |
| *C08F 122/20* | (2006.01) |
| *C04B 28/02* | (2006.01) |
| *C08G 59/17* | (2006.01) |
| *C08G 59/14* | (2006.01) |
| *C08L 63/10* | (2006.01) |
| *C04B 24/26* | (2006.01) |
| *C04B 40/06* | (2006.01) |
| *C04B 111/00* | (2006.01) |

(52) U.S. Cl.
CPC ........ *C08F 122/20* (2013.01); *C04B 24/2647* (2013.01); *C04B 28/02* (2013.01); *C04B 40/065* (2013.01); *C08G 59/1466* (2013.01); *C08G 59/1494* (2013.01); *C08L 63/10* (2013.01); *C04B 2111/00715* (2013.01)

(58) Field of Classification Search
None
See application file for complete search history.

(56) References Cited

U.S. PATENT DOCUMENTS

| | | | | |
|---|---|---|---|---|
| 3,980,483 A | * | 9/1976 | Nishikubo | G03F 7/031 430/281.1 |
| 5,576,399 A | * | 11/1996 | Roth | C08G 59/066 525/476 |
| 5,677,398 A | * | 10/1997 | Motoshima | C08F 290/064 430/280.1 |
| 6,815,517 B2 | * | 11/2004 | Burgel | C04B 26/06 526/217 |
| 7,739,618 B2 | | 7/2010 | Constanz et al. | |
| 7,753,618 B2 | | 7/2010 | Constantz et al. | |

FOREIGN PATENT DOCUMENTS

| | | |
|---|---|---|
| EP | 0 589 831 A1 | 3/1994 |
| EP | 0589831 | 3/1994 |
| EP | 0632079 | 1/1995 |
| JP | 6-263501 A * | 9/1994 |
| JP | 2002-206014 | 7/2002 |
| JP | 2002275237 | 9/2002 |
| JP | 2003-149475 | 5/2003 |
| JP | 2007-284578 | 11/2007 |
| SU | 679150 | 8/1979 |

OTHER PUBLICATIONS

Hexion Technical Data Bulletin, Epon Resin 828, Sep. 2005, 8 pages.*
International Search Report in PCT/EP2013/074227 dated Feb. 25, 2014.

* cited by examiner

*Primary Examiner* — Ana L Woodward
(74) *Attorney, Agent, or Firm* — Grüneberg and Myers PLLC

(57) ABSTRACT

The invention relates to a resin mixture having a modified epoxy (meth)acrylate resin as the base resin, and optionally at least one reactive diluent, at least one stabilizer, and at least one accelerator, wherein the modified epoxy (meth) acrylate resin can be obtained by reacting organic compounds having epoxide groups with (meth)acrylic acid, and then by the partial esterification of the β-hydroxyl-groups, the same formed during the reaction, with the anhydride of a saturated dicarboxylic acid, to reactive resin mortars containing the same, and to the use thereof for the purpose of chemical fastening, by means of which it is possible to manufacture products which are not subject to labeling requirements and which additionally provide high bond strength.

20 Claims, No Drawings

RESIN MIXTURE BASED ON EPOXY(METH)ACRYLATE RESIN, AND THE USE THEREOF

RELATED APPLICATIONS

This application claims priority to, and is a continuation of International Patent Application No. PCT/EP2013/074227 having an International filing date of Nov. 20, 2013, which is incorporated herein by reference, and which claims priority to German Patent Application No. 10 2012 221 446.1, having a filing date of Nov. 23, 2012, which are also incorporated herein by reference in their entirety.

FEDERALLY SPONSORED RESEARCH OR DEVELOPMENT

Not Applicable

MICROFICHE/COPYRIGHT REFERENCE

Not Applicable

BRIEF SUMMARY OF THE TECHNOLOGY

The invention relates to a resin mixture having a modified epoxy (meth)acrylate resin as a base resin, a reactive resin mortar containing this resin mixture, and its use for chemical fastening.

BACKGROUND OF THE INVENTION

The use of reactive resin mortars based on free radical curable compounds as the binder has long been known. In the field of fastening technology, the use of resin mixtures as organic binder for chemical fastening technology, such as plugging compound, has become common. Such applications involve composite compositions which are formulated as multicomponent systems, wherein one component contains the A component—the resin mixture—and the other component contains the B component—the curing agent. Other conventional ingredients can be contained in one and/or the other component, including organic or inorganic aggregates, such as fillers, accelerators, inhibitors, stabilizers, thixotropic agents, desensitizing agents, thickeners and solvents—including reactive solvents (reactive diluents)—and dyes, for example. The curing reaction—that is, the polymerization—is then initiated by mixing the two components, hardening the resin into a duromer.

Vinyl ester resins and unsaturated polyester resins are frequently used as free-radical curable compounds, particularly for chemical fastening. These include certain reactive diluents to adjust the viscosity. Furthermore, it is known from DE 10 2004 035 567 A1 that the reactive resin mortar can be optimized to a certain substrate by appropriate selection of the reactive diluents. It can be understood from this publication that the bond strength can be significantly increased in concrete when hydroxyalkyl (meth)acrylates are used as reactive diluents. Accordingly, current two-component fast curing plugging compounds are based on resin mixtures that contain significant amounts of, in most cases, hydroxypropyl methacrylate (abbreviated below as HPMA). The HPMA, as well as other hydroxyalkyl (meth) acrylates, such as hydroxyethyl methacrylate (HEMA), are classified as irritants (Xi); as a result, because of the substantial amounts of these compounds contained in the resin mixtures, the resin component of these products must also be labeled as an irritant (Xi). The omission of these polar monomers usually leads to significantly poorer performance of the plugging compound.

As such, users of composite mortar systems must currently choose between systems on the market with moderate performance with respect to bond strength but without labeling, and systems with higher performance with respect to bond strength but with labeling.

BRIEF DESCRIPTION OF SEVERAL VIEWS OF THE DRAWINGS

Not Applicable

BRIEF SUMMARY OF THE INVENTION

In one embodiment, the present resin mixture comprises a modified epoxy (meth)acrylate resin as the base resin, wherein the modified epoxy (meth)acrylate resin can be obtained by (i) reacting organic compounds having epoxide groups, with a number average molar mass in the range 129 to 2400 g/mol, with (meth)acrylic acid, and (ii) the partial esterification of β-hydroxyl-groups formed during the reaction with the anhydride of a saturated C3-C5-dicarboxylic acid.

The resin mixture can be used to produce a reactive resin mortar containing the resin mixture and inorganic and/or organic aggregates. The resin mortar can be used to produce a two-component reactive resin mortar system, comprising a reactive resin mortar and a hardener. The reactive resin mortar can be used for the purpose of chemical fastening.

DETAILED DESCRIPTION OF THE INVENTION

The object of the invention is to provide a reactive resin mortar which enables high bond strength without the use of hydroxyalkyl (meth)acrylates, which require labeling, said bond strength being greater than the reactive resin mortars currently on the market and free from labeling requirements.

According to the invention, this is achieved by the use of epoxy (meth)acrylate resins wherein a small fraction of the hydroxyl-groups thereof have been modified with the anhydride of a saturated C3-C5-dicarboxylic acid.

The following explanations of terminology used in the context of the invention are included here as practical assistance to understanding the invention:

"base resin": the pure, curing or curable compound which is cured by polymerization alone or with reagents such as curing agents, accelerators, and the like (not included in the base resin); the curable compounds can be monomers, dimers, oligomers and prepolymers;

"resin master batch": the product of the manufacture of the base resin following synthesis (without isolation of the base resin), which can contain reactive diluents, stabilizers and catalysts;

"resin mixture": a mixture of the resin master batch and accelerators, as well as stabilizers and optionally other reactive diluents; this term is used interchangeably with the term "organic binder";

"reactive resin mortar": a mixture of the resin mixture and inorganic aggregates; the term "A component" is used interchangeably;

"curing agents": substances which cause the polymerization (curing) of the base resin;

"hardener": a mixture of curing agent and organic and/or inorganic aggregates;

"accelerator": a compound which is capable of speeding up the polymerization reaction (curing), which serves to accelerate the formation of the free radical initiator;

"polymerization inhibitor" a compound capable of inhibiting the polymerization reaction (curing), which serves, on the one hand, to prevent the polymerization reaction and therefore an undesired premature polymerization of the free radical polymerizable compound during storage—wherein these compounds are typically used in such small amounts that the gel time is not affected; on the other hand, the polymerization inhibitor serves the purpose of delaying the polymerization reaction immediately after the addition of the curing agent, wherein the compounds are usually used in amounts such that the gel time is affected;

"reactive diluent": liquid or low-viscosity base resins which dilute other base resins, the resin master batch, or the resin mixture, thereby providing the necessary viscosity for the application thereof, which contain functional groups capable of reacting with the base resin, and which become the majority component of the cured composition (mortar) in the polymerization (curing); also referred to as co-polymerizable monomer.

"gel time": For unsaturated polyester or vinyl resins, which are usually cured with peroxides, the duration of the curing phase of the resin corresponds to the gel time, during which the temperature of the resin increases from +25° C. to +35° C. This corresponds roughly to the period in which the fluidity or viscosity of the resin is still in such a range that the reactive resin or the reactive resin composition can be easily processed and/or finished;

"gel time drift" (for a certain, selected period of time—for example 30 or 60 days): refers to the phenomenon that, when the curing [occurs at] a different time than the standard reference time of curing—for example, 24 hours after production of the reactive resin and/or the reactive resin composition—the observed gel time deviates from the reference time point;

"mortar composition": a formulation which contains, in addition to the reactive resin composition, additional organic or inorganic fillers and can be used directly for the purpose of chemical fastening without further preparation;

"two-component mortar system": a system which comprises an A component, the reactive resin mortar, and a B component, the hardener, wherein the two components are stored separately to inhibit reaction, so that the reactive resin mortar only hardens after the mixing thereof;

"(meth)acryl . . . / . . . (meth)acryl . . . "; used to denote both "methacryl . . . / . . . methacryl . . . " compounds and "acryl . . . / . . . acryl . . . " compounds;

"epoxy (meth)acrylates": derivatives of epoxide resins which have acriylate- or methacrylate groups and which are substantially free of epoxy groups;

"epoxide equivalent weight": the amount of epoxy resin in [g] which comprises and functions as one epoxide equivalent [eq]; the epoxide equivalent weight is calculated from the molar mass M in [g/mol] divided by the functionality f in [eq/mol]; (EEW [g/eq]);

"carboxylic acid equivalent weight": the amount of carboxylic acid compound in [g] which comprises and functions as one carboxylic acid equivalent [eq], and is calculated from the molar mass M in [g/mol] divided by the functionality f in [eq/mol]; (COOH-EW [g/eq]);

"cold-curing": means that the resin mixtures and reactive resin mortar can completely cure at room temperature.

Reactive resin mortars are generally prepared by loading the starting compounds necessary for the production of the base resin, optionally together with catalysts and solvents—particularly reactive diluents—into a reactor and initiating the reaction thereof. After completion of the reaction and, if appropriate, at the beginning of the reaction, polymerization inhibitors are added to the reaction mixture to prevent premature polymerization, thereby producing the so-called resin master batch. Accelerators for the curing of the base resin, additional inhibitors if necessary to adjust the gel time, wherein the same can be identical to or different from the stabilizer used for storage stability, and optionally further solvents, particularly reactive diluents, are frequently added to the resin master batch, thereby producing the resin mixture. For the purpose of adjusting various properties such as the rheology and the concentration of the base resin, inorganic aggregates are added to this resin mixture, thereby producing the reactive resin mortar.

A preferred resin mixture accordingly contains at least one base resin, at least one reactive diluent, at least one accelerator, and polymerization inhibitors. A reactive resin mortar preferably contains, in addition to the resin mixture just described, organic and/or inorganic aggregates, wherein inorganic aggregates as described in more detail below are particularly preferred.

A first subject matter of the invention relates to a resin mixture with a modified epoxy (meth)acrylate resin as a base resin, wherein the modified epoxy (meth)acrylate resin can be obtained by (i) reacting organic compounds having epoxide groups, with a number average molar mass $\overline{M}_n$ in the range 129 to 2400 g/mol, with (meth)acrylic acid, and then (ii) the partial esterification of the β-hydroxyl-groups, the same formed during the reaction, with the anhydride of a saturated $C_3$-$C_5$-dicarboxylic acid.

Surprisingly, reactive resin mortars based on such resin mixtures have a comparable-to-slightly-higher bond strength compared to non-modified epoxy (meth)acrylates. However, also in comparison to reactive resin mortars based on epoxy (meth)acrylates with hydroxyl-groups which have been partly modified with unsaturated dicarboxylic acids such as maleic anhydride, it has been possible to achieve to some extent a higher bond strength—even though the double bond density per resin molecule is increased by the maleic acid. According to DE 19956779 A1, resin systems with higher density of double bonds per molecule should have greater thermal and chemical resistance, and therefore strength, relative to comparable systems with lower density of double bonds per molecule. Accordingly, it was surprising that it is possible to achieve better performance, particularly with respect to the bond strength in the field of chemical fastening technology, with reactive resin mortars based on the resin mixture according to the invention.

Furthermore, it is possible to formulate reactive resin mortars using the resin mixture according to the invention, which dispense with the use of hydroxyalkyl (meth)acrylates, particularly the commonly-used hydroxypropylmethacrylate, as reactive diluents, without this approach having a negative effect on the bond strength.

The epoxy (meth)acrylate resins are obtained by reacting an organic compound containing an epoxide group with acrylic acid or methacrylic acid, such that the resins necessarily have acryloxy- or methacryloxy-groups in terminal positions, and hydroxyl-groups at the 2-position relative to the established acryloxy- or methacryloxy-group (also called β-hydroxyl-groups below) in the primary chain of the molecule. 0.7 to 1.2 carboxylic acid equivalents of (meth) acrylic acid are advantageously used per equivalent of epoxide. The organic compounds which contain epoxide groups, and the (meth)acrylic acid, are preferably used in approximately stoichiometric ratios in this case—that is, per epoxide equivalent of the organic compound, about one equivalent of (meth)acrylic acid is used. The reaction is carried out in the presence of suitable catalysts which are known for this purpose to a person skilled in the art, such as quaternary ammonium salts.

As the organic compounds which contain epoxide groups, it is advantageous that those which have a molecular weight corresponding to a number average molar mass in the range from 129 to 2400 g/mol, and which contain on average at least one, and preferably 1.5 to 2 epoxide groups per molecule, are used. Particularly preferred are the epoxide groups of the glycidyl ether or glycidyl ester type, obtained by reacting an epihalohydrin, particularly epichlorohydrinr, with a mono- or multi-functional aliphatic or aromatic hydroxyl-compound, thiol-compound, carboxylic acid, or a mixture thereof. The resulting organic compound containing epoxide groups has an epoxide equivalent weight (EEW) which is preferably in the range from 87 to 1600 g/eq, more preferably in the range of 160 to 800 g/eq, and most preferably in the range of 300 to 600 g/eq.

Examples of suitable compounds which contain epoxide groups are polyglycidyl ethers of polyhydric phenols such as pyrocatechol, resorcinol, hydroquinone, 4,4'-dihydroxydiphenyl methane, 2,2-(4,4'-dihydroxydiphenyl) propane (bisphenol A), bis(4-hydroxyphenyl) methane (bisphenol F), 4,4'-dihydroxydiphenylsulfone (bisphenol S), 4,4'-dihydroxydiphenyl cyclohexane, tris(4-hydroxyphenyl) methane, and novolacs (i.e., from reaction products of monohydric or polyhydric phenols with aldehydes, particularly formaldehyde, in the presence of acid catalysts) such as phenol novolac resin and cresol novolac resin.

In addition, the following are named by way of example, but not as an exhaustive list: glycidyl ethers of monohydric alcohols such as n-butanol or 2-ethylhexanol; or glycidyl ethers of polyhydric alcohols such as 1,3-butanediol, 1,4-butanediol, 1,6-hexanediol, glycerol, benzyl alcohol, neopentyl glycol, ethylene glycol, cyclohexane dimethanol, trimethylolpropane, pentaerythritol and polyethylene glycols, triglycidyl isocyanurate; polyglycidyl polyhydric thiols such as bis(mercaptomethyl)benzol; or glycidyl esters of monocarboxylic acids such as versatic acid; or glycidyl esters of polybasic, aromatic and aliphatic carboxylic acids, such as diglycidyl ester of phthalic acid, isophthalic diglycidyl ester, terephthalic diglycidyl ester, tetrahydrophthalic diglycidyl ester, adipic acid diglycidyl ester and hexahydrophthalic diglycidyl ester.

Diglycidyl ethers of dibasic hydroxyl-compounds of the general formula (I) are particularly preferred as organic compounds containing epoxide groups:

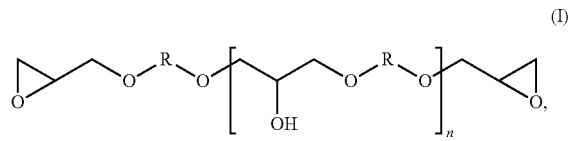

(I)

wherein R is an unsubstituted or substituted aliphatic or aromatic group, preferably an aromatic group, and more preferably an aromatic group having 6 to 24 carbon atoms, wherein the average value for n is 0 to 3. R is particularly preferably a group of the bisphenol type, such as bisphenol A, bisphenol F or bisphenol S, or of the novolac type, wherein a bisphenol-type group is very particularly preferred. The average value of n is preferably approximately 0.1, approximately 1, or approximately 2. In the context of the invention, compounds in which n is ≈0.1 are considered as monomers, and compounds in which n is ≈1 or 2 are considered as polymers.

The polymeric compounds have the advantage over the monomeric compounds that the base resin content in the resin mixture can be significantly reduced, which makes the resin mixture more economical to manufacture since it is possible to reduce the manufacturing cost as a result.

The organic compound containing the epoxide groups can either be produced neat or in appropriate solvents, wherein the reactive diluents which are explained in more detail below are preferably used as the solvent.

The modified epoxy (meth)acrylate resins are obtained according to the invention by only partial esterification of the β-hydroxyl-groups of an epoxy (meth)acrylate resin with the anhydride of a saturated $C_3$-$C_5$-dicarboxylic acid. The saturated $C_3$-$C_5$-dicarboxylic acid is selected from among propanedioic acid (also: malonic acid), succinic acid, and pentanedioic acid (also: glutaric acid). The succinic anhydride is particularly preferred according to the invention.

The esterification of a low proportion of the β-hydroxyl-groups in this case already has a positive effect on the bond strength under standard conditions (+20° C.) and at elevated temperatures (+40° C.). To achieve higher bond strength at lower temperatures in the range of −10° C., a higher degree of modification is required—at least where monomeric epoxy (meth)acrylates are used.

1 to 50 mol %, preferably 2 to 30 mol %, and more preferably 3 to 15 mol % of anhydride of saturated $C_3$-$C_5$-dicarboxylic acid is advantageously used per β-hydroxyl-group of the epoxy (meth)acrylate resin for the esterification of the β-hydroxyl groups of the epoxy (meth)acrylate.

As the base resin, a modified epoxy (meth)acrylate resin or a mixture of epoxy (meth)acrylate resins can be used, wherein the mixture can consist of an epoxy (meth)acrylate resin with varying degrees of modification, or of different epoxy (meth)acrylate resins with the same or different degrees of modification.

The base resin, i.e. the modified epoxy (meth)acrylate resin, is used in an amount of 20 to 100 wt %, preferably 20 to 60 wt %, with respect to the resin mixture, this amount depending among other things on whether the base resin is monomeric or a polymeric resin according to the above definition.

In one preferred embodiment of the invention, the resin mixture contains other low-viscosity, free radical co-polymerizable compounds, preferably compounds which are not subject to labeling requirements, such as reactive diluents, for the purpose of adjusting the viscosity of the modified epoxy (meth)acrylates and/or precursors during production of the same, if necessary. The reactive diluents can be added in an amount of 0 to 80 wt %, preferably 40 to 80 wt % with respect to the resin mixture. A portion thereof can originate from the resin master batch.

Suitable reactive diluents are described in the applications EP 1935860 A1 and DE 195 31 649 A1. The resin mixture preferably contains a (meth)acrylic acid ester as a reactive diluent, wherein it is particularly preferred that aliphatic or aromatic C5-C15-(meth)acrylates are selected. Suitable examples include: hydroxypropyl (meth)acrylate, 1,2-ethanediol di(meth)acrylate, 1,3-propanediol di(meth)acrylate, 1,3-butanediol di(meth)acrylate, 1,4-butanediol di(meth)

acrylate, trimethylolpropane tri(meth)acrylate, phenethyl (meth)acrylate, tetrahydrofurfuryl (meth)acrylate, ethyltriglycol (meth)acrylate, N,N-dimethylaminoethyl (meth)acrylate, N,N-dimethylaminomethyl (meth)acrylate, acetoacetoxyethyl (meth)acrylate, isobornyl (meth)acrylate, 2-ethylhexyl (meth)acrylate, diethylene glycol di(meth)acrylate, methoxypolyethylene (meth)acrylate, trimethyl cyclohexyl (meth)acrylate, 2-hydroxyethyl (meth)acrylate, dicyclopentenyloxyethyl (meth)acrylate and/or tricyclopentadienyl di(meth)acrylate, bisphenols A (meth)acrylate, novolac epoxy di(meth)acrylate, di-[(meth)acryloyl-maleoyl]tricyclo-[5.2.1.0.$^{2.6}$]decane, dicyclopentenyl oxyethyl crotonate, 3-(meth)acryloyl oxymethyl tricylo-[5.2.1.0$^{2.6.}$] decane, 3-(metha)cyclopentadienyl (meth)acrylate, isobornyl (meth)acrylate, and decalyl-2-(meth)acrylate; PEG di(meth)acrylates such as PEG200 di(meth)acrylate, tetraethylene glycol di(meth)acrylate, solketal (meth)acrylate, cyclohexyl (meth)acrylate, phenoxyethyl di(meth)acrylate, methoxyethyl (meth)acrylate, tetrahydrofurfuryl (meth) acrylate, tert-butyl (meth)acrylate and norbornyl (meth) acrylate. In principle, other conventional free-radical polymerizable compounds can be used, either alone or in a mixture with the (meth)acrylic acid esters, including styrene, α-methylstyrene, alkylated styrenes such as tert-butyl styrene, divinyl benzene and allyl compounds, for example, wherein the non-hazardous representatives thereof are preferred.

To stabilize against premature polymerization, the resin mixture can contain a polymerization inhibitor. The polymerization inhibitor is preferably included in an amount of from 0.0005 to 2 wt %, and more preferably 0.01 to 1 wt %, with respect to the resin mixture.

The resin mixture can further contain, for the purpose of additionally adjusting the gel time and the reactivity, between 0.005 and 3 wt %, preferably 0.05 to 1 wt %, with respect to the resin mixture, of a polymerization inhibitor.

As polymerization inhibitors, polymerization inhibitors commonly used for free-radically polymerizable compounds, known to a person skilled in the art, are suitable according to the invention.

To stabilize against premature polymerization, resin mixtures and reactive resin mortars typically contain polymerization inhibitors such as hydroquinone, substituted hydroquinones, e.g. 4-methoxyphenol, phenothiazine, benzoquinone or tert-butylcatechol, as described in EP 1935860 A1 or EP 0965619 A1, for example, stable nitroxyl-radicals, also called N-oxyl-radicals, such as piperidinyl-N-oxyl or tetrahydropyrrolidine-N-oxyl, as described in DE 19531649 A1. It is particularly preferred that 4-hydroxy-2,2,6,6-tetramethylpiperidine-N-oxyl (referred to as Tempol in the following) is used for stabilization, which offers the advantage that it is also possible to adjust the gel time by means of the same.

The polymerization inhibitors are preferably chosen from among phenolic compounds and non-phenolic compounds, such as stable free radicals and/or phenothiazines.

As phenolic polymerization inhibitors, which are often components of commercial free-radically curing reactive resins, phenols such as 2-methoxyphenol, 4-methoxyphenol, 2,6-Di-tert-butyl-4-methylphenol, 2,4-Di-tert-butylphenol, 2,6-Di-tert-butylphenol, 2,4,6-trimethylphenol, 2,4,6-tris (dimethylaminomethyl) phenol, 4,4'-thio-bis (3-methyl-6-tert-butylphenol), 4,4'-isopropylidenediphenol, 6,6'-Di-tert-butyl-4,4'-bis(2,6-Di-tert-butylphenol), 1,3,5-trimethyl-2,4,6-tris(3,5-Di-tert-butyl-4-hydroxybenzyl) benzene, 2,2'-methylene-di-p-cresol, pyrocatechol and butylpyrocatechol such as 4-tert-butylcatechol, 4,6-Di-tert-butylcatechol, hydroquinones such as hydroquinone, 2-methylhydroquinone, 2-tert-butylhydroquinone, 2,5-Di-tert-butylhydroquinone, 2,6-Di-tert-butylhydroquinone, 2,6-dimethylhydroquinone, 2,3,5-trimethylhydroquinone, benzoquinone, 2,3,5,6-tetrachloro-1,4-benzoquinone, methylbenzoquinone, 2,6-dimethylbenzoquinone, naphthoquinone, or mixtures of two or more thereof, can be contemplated.

As non-phenolic polymerization inhibitors, the following are preferred: phenothiazines such as phenothiazine and/or derivatives or combinations thereof or stable organic free radicals such as galvinoxyl and N-oxyl radicals.

Suitable stable N-oxyl radicals (nitroxyl radicals) can be selected from among 1-oxyl-2,2,6,6-tetramethylpiperidine, 1-oxyl-2,2,6,6-tetramethylpiperidin-4-ol (also referred to as TEMPOL), 1-oxyl-2,2,6,6-tetramethylpiperidin-4-one (also referred to as TEMPON), 1-oxyl-2,2,6,6-tetramethyl-4-carboxyl-piperidine (also referred to as 4-carboxy-TEMPO), 1-oxyl-2,2,5,5-tetramethylpyrrolidine, 1-oxyl-2,2,5,5-tetramethyl-3-carboxypyrrolidin (also referred to as 3-carboxy-PROXYL), aluminum-N-nitrosophenyl hydroxylamine, and diethylhydroxyl amine, as described in DE 199 56 509. Additional suitable N-oxyl compounds are oximes such as acetaldoxime, acetone oxime, methyl ethyl ketoxime, salicyloxime, benzoxime, glyoximes, dimethylglyoxime, acetone-O-(benzyloxycarbonyl) oxime and the like. Furthermore, pyrimidinol derivatives or pyridinol compounds which are substituted in the para-position to the hydroxyl-group can be used as polymerization inhibitors, as described in the previously unpublished patent DE 10 2011 077 248 B1.

The polymerization inhibitors can be used, depending on the desired properties and the application for the resin mixture, either alone or as a combination of two or more of the same. The combination of the phenolic and the non-phenolic polymerization inhibitors enables a synergistic effect in this case, which is also shown by the adjustment of a substantially drift-free adjustment of the gel time of the reactive resin formulation.

The curing of the resin component is preferably initiated with a free radical initiator such as a peroxide. An accelerator can be used in addition to the free-radical initiator. Fast-curing reactive resin mortars are obtained as a result, wherein the same are cold-curing. Suitable accelerators, which are usually added to the resin mixture, are known in the art. These are, for example, amines—preferably tertiary amines and/or metal salts.

Suitable amines are selected from the following compounds, which are described in patent application US 2011071234 A1, by way of example: dimethylamine, trimethylamine, ethylamine, diethylamine, triethylamine, n-propylamine, di-n-propylamine, tri-n-propylamine, isopropylamine, diisopropylamine, triisopropylamine, n-butylamine, isobutylamine, tert-butylamine, di-n-butylamine, diisobutylamine, tri-isobutylamine, pentylamine, isopentylamine, diisopentylamine, hexylamine, octylamine, dodecylamine, laurylamine, stearylamine, aminoethanol, diethanolamine, triethanolamine, aminohexanol, ethoxyaminoethane, dimethyl-(2-chloroethyl) amine, 2-ethylhexylamine, bis(2-chloroethyl) amine, 2-ethylhexylamine, bis (2-ethylhexyl) amine, N-methylstearylamine, dialkylamines, ethylenediamine, N,N'-dimethylethylenediamine, tetramethylethylenediamine, diethylenetriamine, permethyl-diethylenetriamin, triethylenetetramine, tetraethylenepentamine, 1,2-diaminopropane, di-propylenetriamine, tripropylene tetramine, 1,4-diaminobutane, 1,6-diaminohexane, 4-amino-1-diethylaminopentane, 2,5-diamino-2,5-dimethyl-hexane, trimethylhexamethylenediamine, N,N-dimethylaminoethanol, 2-(2-diethylaminoethoxy) ethanol, bis (2-hydroxyethyl) oleyl amine, tris[2-(2-hydroxy-ethoxy)ethyl] amine, 3-amino-1-propanol, methyl (3-aminopropyl) ether, ethyl (3-aminopropyl) ether, 1,4-butanediol-bis(3-aminopropyl), 3-dimethylamino-1-propanol, 1-amino-2-propanol, 1-diethylamino-2-propanol, diisopropanolamine, methylene bis(2-hydroxypropyl) amine, tris(2-hydroxypropyl) amine, 4-amino-2-butanol, 2-amino-2-methylpropanol, 2-amino-2-methyl-propanediol, 2-amino-2-hydroxymethylpropandiol, 5-diethylamino-2-pentanone, 3-methylaminopropionic acid nitrile, 6-aminohexanoic acid, 11-aminoundecanoic acid, 6-aminohexanoic acid ethyl ester, 11-aminohexanoic acid isopropyl ester, cyclohexylamine, N-methylcyclohexylamine, N,N-dimethylcyclohexylamine, dicyclohexylamine, N-ethylcyclohexylamine, N-(2-hydroxyethyl)-cyclohexylamine, N,N-bis (2-hydroxyethyl)-cyclohexylamine, N-(3-aminopropyl)-cyclohexylamine, aminomethylcyclohexane, hexahydrotoluidine, hexahydrobenzylamine, aniline, N-methylaniline, N,N-dimethylaniline, N,N-diethylaniline, N,N-di-propylaniline, iso-butyl aniline, toluidine, diphenylamine, hydroxyethylaniline, bis(hydroxyethyl) aniline, chloroaniline, aminophenols, aminobenzoic acids and the esters thereof, benzylamine, dibenzylamine, tribenzylamine, methyldibenzylamine, α-phenylethylamine, xylidine, diisopropylaniline, dodecylaniline, aminonaphthalene, N-methylaminonaphthalene, N,N,-dimethylaminonaphthalene, N,N-dibenzyinaphthalene, diaminocyclohexane, 4,4'-diamino-dicyclohexylmethane, diaminodiethyl-dicyclohexylmethane, phenylenediamine, xylylenediamine, diaminobiphenyl, naphthalene diamines, toluidines, benzidines, 2,2-bis(aminophenyl) propane, aminoanisols, aminothiophenols, aminodiphenyl ether, aminocresole, morpholine, N-methylmorpholine, N-phenylmorpholine, hydroxyethylmorpholine, N-methylpyrrolidine, pyrrolidine, piperidine, hydroxyethylpiperidine, pyrrolidines, pyridines, quinolines, indoles, indolenines, carbazoles, pyrazoles, imidazoles, thiazoles, pyrimidines, quinoxalines, aminomorpholine, dimorpholinoethane, [2,2,2]-diazabicyclooctane and N,N-dimethyl-p-toluidine.

Preferred amines are aniline derivatives and N,N-bisalkylarylamines such as N,N, dimethylaniline, N,N-diethylaniline, N,N-dimethyl-p-toluidine, N,N-bis(hydroxyalkyl) arylamines, N,N-bis(2-hydroxyethyl) aniline, N,N-bis(2-hydroxyethyl) toluidine, N,N-bis(2-hydroxypropyl) aniline, N,N-bis(2-hydroxypropyl) toluidine, N,N-bis (3-methacryloyl-2-hydroxypropyl)-p-toluidine, N,N-dibutoxyhydroxypropyl-p-toluidine and 4,4'-bis (dimethylamino) diphenyl methane.

Polymeric amines, such as those which are obtained by the polycondensation of N,N-bis (hydroxyalkyl) aniline with dicarboxylic acids, or by polyaddition of ethylene oxide and these amines, are also suitable for use as accelerators.

Suitable metal salts are, for example, cobalt octoate or cobalt naphthenoate, as well as vanadium, potassium, calcium, copper, manganese or zirconium carboxylates.

If an accelerator is used, it is used in an amount of 0.01 to 10 wt %, and preferably 0.2 to 5 wt %, with respect to the resin mixture.

Another object of the invention is a reactive resin mortar containing, in addition to the above described resin mixture, the organic binder, inorganic and/or organic aggregates such as fillers and/or further additives.

The proportion of the resin mixture in the reactive resin mortar is preferably 10 to 70 wt %, and more preferably 30 to 50 wt %, with respect to the reactive resin mortar.

Accordingly, the proportion of the aggregates is preferably 90 to 30 wt %, and more preferably 70 to 50 wt %, with respect to the reactive resin mortar.

Conventional fillers are used as the fillers, preferably mineral or mineral-like fillers such as quartz, glass, sand, silica sand, quartz flour, porcelain, corundum, ceramics, talc, silica (e.g. fumed silica), silicates, clay, titanium dioxide, chalk, heavy spar, feldspar, basalt, aluminum hydroxide, granite or sandstone, polymeric fillers such as thermosetting plastics, hydraulically curable fillers such as gypsum, quick lime or cement (for example alumina or Portland cement), metals such as aluminum, carbon black, and also wood, mineral or organic fibers or the like, or mixtures of two or more of the above, which can be added as a powder, in granular form or in the form of molded elements. The fillers can be in any arbitrary form, such as a powder or flour, or as molded elements with, by way of example, a cylinder, ring, ball, flake, rod, saddle or crystal shape, and further in the form of fibers (fibrillar fillers); and the corresponding basic particles preferably have a maximum diameter of 10 mm. Fillers are preferably present in the respective component in an amount of up to 90 wt %, particularly 3 to 85 wt %, and specifically 5 to 70 wt %.

Further possible additives are also thixotropic agents, such as optionally organically post-treated fumed silica, bentonites, alkyl- and methylcelluloses, castor oil derivatives or the like, plasticizers such as phthalic acid esters or sebacic acid esters, stabilizers, antistatic agents, thickening agents, flexibilizers, curing catalysts, rheology aids, wetting agents, coloring additives such as dyes or particularly pigments, for example for different staining of the components for better control of the mixing, or the like, or mixtures of two or more of the same. Non-reactive diluents (solvents) can also be included, preferably in an amount up to 30 wt %, with respect to the respective component (reactive resin mortar, curing agent), for example from 1 to 20 wt %, such as lower-allylketones, e.g. acetone, di-lower-alkanolamides such as dimethylacetamide, lower-alkylbenzoles such as xylenes and toluene, phthalic acid esters or paraffins, or water.

In one preferred embodiment of the invention, the reactive resin mortar according to the invention is prepared as a two- or multi-component system, in particular a two-component system, wherein the resin component and the hardener component are separately arranged to inhibit reaction. Accordingly, a first component, the I component (also referred to as the A component), contains the reactive resin mortar, and a second component, the II component (also referred to as the B component), contains the hardener. This ensures that the curable compounds and the curing agent are mixed together, and initiate the curing reaction, just prior to use.

The hardener contains the curing agent to initiate polymerization (curing) of the resin component. This, as mentioned above, is a free radical initiator, and preferably a peroxide.

All peroxides known to a person skilled in the art for the purpose of curing unsaturated polyester resins and vinyl ester resins can be used according to the invention for the purpose of curing the epoxy (meth)acrylate. Such peroxides include organic and inorganic peroxides, either liquid or solid, wherein hydrogen peroxide can also be used. Examples of suitable peroxides are peroxycarbonates (with the formula —OC(O)OO—), peroxy-esters (with the formula —C(O)OO), diacyl-peroxides (with the formula —C(O)OOC(O)—), dialkyl-peroxides (with the formula —OO—), and the like. These can also be present as oligomers or polymers. A comprehensive list of examples for suitable peroxides is presented, for example, in US 2002/0091214 A1, paragraph [0018].

The peroxides are preferably selected from the group of organic peroxides. Suitable organic peroxides are: tertiary alkyl hydroperoxides such as tert-butyl hydroperoxide, and other hydroperoxides, such as cumene hydroperoxide, peroxyesters or per-acids, such as tert-butyl per-esters, benzoyl peroxide, peracetates and perbenzoates, lauryl peroxide, including (di)peroxy ester, per-ethers such as peroxydiethylether, per-ketones such as methylethylketone peroxide. The organic peroxides used as curing agents are often tertiary per-esters or tertiary hydroperoxides—that is, peroxide compounds with tertiary carbon atoms bonded directly to an —OO-acyl- or —OOH group. However, mixtures of these peroxides with other peroxides can also be used according to the invention. The peroxides can also be mixed peroxides—that is, peroxides which have two different peroxygen-bearing units in one molecule. Benzoyl peroxide (BPO) is preferably used for the purpose of curing.

The peroxides are employed in amounts of from 0.1 to 10 wt %, preferably 0.1 to 3 wt %, and more preferably below 1 wt %, with respect to the reactive resin mortar.

The hardener of the two-component mortar system preferably further comprises inorganic aggregates, wherein the aggregates can be the same as those added to the reactive resin mortar, as well as water or other liquid substituents.

The aggregates are employed in this case in amounts of 20 to 90 wt %, and preferably 50 to 80 wt %, with respect to the hardener component.

In one particularly preferred embodiment of the two-component mortar system, the A component contains, in addition to the reactive resin mortar, a hydraulically setting or polycondensable inorganic compound, and the B component contains, in addition to the curing agent, water. Such mortar compositions are described in detail in DE 42 31 161 A1. Preferably, the A component contains cement as the hydraulically setting or polycondensable inorganic compound, such as Portland cement or alumina, wherein iron oxide-free or low-iron oxide cements are particularly preferred. Gypsum can also be used as the hydraulically setting inorganic compound, directly or in mixture with the cement. Siliceous, polycondensable compounds, in particular soluble, dissolved and/or amorphous silica-containing materials, can be used as the polycondensable inorganic compound.

The two-component mortar system preferably holds the A component and the B component separately in different containers to inhibit reaction—for example in a multi-chamber apparatus such as a multi-chamber cartridge, wherein the two components can be pressed out of such containers by the action of mechanical compressive forces or the application of gas pressure, and then mixed. A further option is that of assembling the two-component mortar system as two-component capsules which are inserted into the borehole and are destroyed by setting the fastening element by means of percussive rotation, resulting in simultaneous mixing of the two components of the mortar composition. A cartridge system or an injection system is preferably used wherein the two components are pressed out of the separate containers and fed through a static mixer where they are homogeneously mixed and then discharged through a nozzle preferably directly into the bore hole.

The resin mixture according to the invention, the reactive resin mortar, and the two-component mortar system are primarily used in the construction field, for example for the restoration of concrete, as polymer concrete, as a coating composition based on synthetic resins, or as a cold-curing road marking. They are particularly suitable for the chemical fastening of anchoring elements, such as anchors, rebar, screws and the like, use in bore holes [sic], particularly in bore holes in various substrates, particularly mineral substrates, such as those based on concrete, aerated concrete, brickwork, lime sand block, sandstone, natural stone, and the like.

The following examples serve to further illustrate the invention.

Embodiments

I) Resin Master Batches

A1) Synthesis of Monomeric Bisphenol a Diglycidyl Dimethacrylate (Bis-GMA) (n~0.1)

220 g of bisphenol A diglycidyl ether (EEW (DIN 16945) 182-192 g/eq; Epilox® A 19-03; LEUNA-Harze GmbH) is filled in its entirety into the reactor, then 110 g of methacrylic acid, 0.1 g of phenothiazine, and 2 g of tetraethyl ammonium bromide are added, and heated to approx. 80° C.

The conversion of the epoxide groups is determined continuously during the reaction by titration of the epoxy groups according to DIN 16945. Once a conversion of at least 97% is achieved, the reaction can be terminated.

A2) Synthesis of Polymeric Bisphenols a Diglycidyl Dimethacrylate (Bis-GMA) (n~1)

493 g of bisphenol A diglycidyl ether (EEW (DIN 16945) 300-340 g/eq; Epilox® A 32-02) is filled in its entirety into the reactor, to which is added 143 g methacrylic acid, 0.2 g of phenothiazine, 159 g of polyethylene glycol 200 dimethacrylate (PEG200DMA) and 5 g of tetraethyl ammonium bromide, which is then heated to approx. 80° C.

The conversion of the epoxide groups is determined continuously during the reaction by titration of the epoxy groups according to DIN 16945. Once a conversion of at least 97% is achieved, the reaction can be terminated.

A3) Synthesis of Polymeric Bisphenol a Diglycidyl Dimethacrylate (Bis-GMA) (n~2)

346 g of bisphenol A diglycidyl ether (EEW (DIN 16945) 450-500 g/eq; Epilox® A 50-02; LEUNA-Harze GmbH) is filled in its entirety into the reactor, to which is added 68 g of methacrylic acid, 0.1 g of phenothiazine, 104 g of polyethylene glycol 200 dimethacrylate, and 3.2 g of tetraethyl ammonium bromide, which is then heated to approx. 80° C.

The conversion of the epoxide groups is determined continuously during the reaction by titration of the epoxy groups according to DIN 16945. Once a conversion of at least 97% is achieved, the reaction can be terminated.

The resin master batches A1 to A3 serve, on the one hand, as non-modified resins, as a comparison, and on the other hand as starting materials for the modification carried out according to the invention with succinic anhydride (B1 to B3) and—as a comparison—with maleic anhydride (C1 and C3).

B1.1) and B1.2) Synthesis of Monomeric Bis-GMA Resins Modified with Succinic Anhydride (n~0.1)

The amounts of succinic anhydride indicated in Table 1 are added, in each case, to the reaction product from A1), stirred at 80° C. and cooled to room temperature after a

TABLE 1

Amounts of succinic anhydride used

| Resin master batch | B1.1 | B1.2 |
|---|---|---|
| Mol % succinic anhydride per Bis-GMA. (n~0.1) | 8 | 40 |
| Mol % succinic anhydride per β-OH group | 4 | 20 |

B2.1) and B2.2) Synthesis of Polymeric Bis-GMA Resins Modified with Succinic Anhydride (n~1)

The amounts of succinic anhydride indicated in Table 2 are added, in each case, to the reaction product from A2), stirred at 80° C. and cooled to room temperature after a reaction time of 6 hours.

TABLE 2

Amounts of succinic anhydride used

| Resin master batch | B2.1 | B2.2 |
|---|---|---|
| Mol % succinic anhydride per Bis-GMA (n~1) | 7 | 30 |
| Mol % succinic anhydride per β-OH group | 2 | 10 |

B3.1) and B3.2) Synthesis of Polymeric Bis-GMA Resins Modified with Succinic Anhydride (n~2)

The amounts of succinic anhydride indicated in Table 3 are added, in each case, to the reaction product from A3), stirred at 80° C. and cooled to room temperature after a reaction time of 6 hours.

TABLE 3 amount of succinic anhydride used

| Resin master batch | B3.1 | B3.2 |
|---|---|---|
| Mol % succinic anhydride per Bis-GMA (n~2) | 7 | 40 |
| Mol % succinic anhydride per β-OH group | 2 | 10 |

C1.1) and C1.2) Synthesis of Monomeric Bis-GMA Resins Modified with Maleic Anhydride (n~0.1)

The amounts of maleic anhydride indicated in Table 4 are added, in each case, to the reaction product from A1), stirred at 80° C. and cooled to room temperature after a reaction time of 6 hours.

TABLE 4

Amount of maleic anhydride used

| Resin master batch | C1.1 | C1.2 |
|---|---|---|
| Mol % of maleic anhydride per Bis-GMA (n~0.1) | 20 | 40 |
| Mol % of maleic anhydride per β-OH group | 10 | 20 |

C3.1) Synthesis of Polymeric Bis-GMA Resins Modified with Maleic Anhydride-Modified (n~2)

The amounts of maleic anhydride indicated in Table 5 are added, in each case, to the reaction product from A3), stirred at 80° C. and cooled to room temperature after a reaction time of 6 hours.

TABLE 5 amount of maleic anhydride used

| Resin master batch | C3.1 |
|---|---|
| Mol % of maleic anhydride per Bis-GMA (n~2) | 1 |
| Mol % of maleic anhydride per β-OH group | 2 |

II) Resin Mixtures

For the preparation of the resin mixtures, each of the resin master batches A to C described above is mixed with PEG200DMA, 1,4-butanediol dimethacrylate (BDDMA), tert-butyl pyrocatechol (tBBK), and 4-hydroxy-2,2,6,6-tetramethylpiperidine-1-oxyl (Tempol). The amounts used are listed in Table 6 below. Subsequently, the gel time of each resulting resin mixture is adjusted by means of an aromatic amine to approx. 6 minutes

TABLE 6

Amounts of the components for the preparation of the resin mixtures

| Component | A1/B1/C1 (each n~0.1) | A2/B2 (each n~1) | A3/B3/C3 (each n~2) |
|---|---|---|---|
| | | Amount [wt %] | |
| Resin master batch | 39.2 | 42.54 | 36.14 |
| PEG200DMA | 25.4 | 19.6 | 23.5 |
| BDDMA | 35.3 | 37.8 | 40.3 |
| tBBK | 0.05 | 0.04 | 0.04 |
| Tempol | 0.015 | 0.015 | 0.015 |

The gel time is determined by means of a commercially available device (GELNORM® gel timer) at a temperature of 25° C. For this purpose, each of the A and the B components are mixed at a volume ratio of 3:1, and heated immediately after mixing in a silicone bath to 25° C., whereupon the temperature of the sample is measured. The sample itself is situated in a test tube which is placed in an air jacket lowered into a silicone bath for the heating process.

The heat generation of the sample is plotted against time. The evaluation is made according to DIN 16945, Part 1 and DIN: 16916. The gel time is the time at which a temperature rise of 10 K is achieved—in this case from 25° C. to 35° C.

C) Reactive Resin Mortar

To produce the hybrid resin, the resin mixtures are mixed to a homogenous mortar composition in a dissolver with 30-45 parts by weight of silica sand, 15-25 parts by weight of cement, and 1-5 parts by weight of fumed silica.

D) Hardener Component

To produce the hardener component, 13 g of dibenzoyl peroxide, 23 g of water, 1 g of fumed silica, 19 g of alumina and 46 g of quartz powder with a suitable particle size distribution are mixed in a dissolver to form a homogeneous composition.

The respective reactive resin mortar and the hardener components are mixed together in a volume ratio of 3:1, and their bond strength is measured.

Determination of the Bond Stress Failure (τ)

M12 threaded anchor rods are used to determine the bond stress failure of the cured material, said anchor rods being inserted, with the reactive resin mortar compositions in the examples and the comparative examples, into bore holes in concrete which have a diameter of 14 mm and a hole depth of 72 mm. The average failure loads are determined by centered tension on the threaded anchor rods. In each case, three threaded anchor rods are anchored in bore holes, and their load values are determined after 24 h of hardening. The bond strengths τ determined in this case (N/mm2) are reported below in Tables 7 to 9 as averages.

Various bore hole conditions and/or curing conditions were tested as listed below.

| Test condition | Note |
|---|---|
| Reference | thoroughly cleaned, hammer-drilled hole, curing at room temperature (20° C.) |
| −10° C. | Reference holes, setting and curing at a substrate temperature of −10° C. |
| +40° C. | Reference holes, setting and curing at a substrate temperature of +40° C. |

TABLE 7

Bond strengths τ monomeric Bis-GMA resins (n~0.1)

| | | Example | | Comparative Example | | |
|---|---|---|---|---|---|---|
| n~0.1 | | B1.1 | B1.2 | A1 | C1.1 | C1.2 |
| Composite loads τ [N/mm²] | Ref. | 20.8 ± 1.6 | 21.5 ± 0.5 | 19.3 ± 2.2 | 21.9 ± 0.2 | 21.1 ± 2.1 |
| | −10° C. | 15 ± 0.7 | 18.0 ± 1.6 | 16.7 ± 1.4 | 14.4 ± 2.6 | 13.5 ± 3.1 |
| | +40° C. | 18.4 ± 3.0 | 21.4 ± 1.2 | 21.1 ± 0.5 | 21.6 ± 1.7 | 21.9 ± 1.4 |

TABLE 8

Bond strengths τ Bis-GMA polymeric resins (n~1)

| | | Example | | Comparative Example |
|---|---|---|---|---|
| n~1 | | B2.1 | B2.2 | A2 |
| Composite loads τ [N/mm²] | Ref. | 18.2 ± 1.1 | 20.0 ± 1.6 | 17.7 ± 1.3 |
| | −10° C. | 16.8 ± 0.8 | 16.8 ± 1.3 | 16.5 ± 0.8 |
| | +40° C. | 23.1 ± 1.1 | 20.7 ± 1.6 | 21.7 ± 0.9 |

TABLE 9

Bond strength τ polymeric Bis-GMA resins (n~2)

| | | Example | | Comparison Example | |
|---|---|---|---|---|---|
| n~2 | | B3.1 | B3.2 | A3 | C3.1 |
| Composite loads τ [N/mm²] | Ref. | 20.8 ± 0.9 | 18.0 ± 2.0 | 17.0 ± 1.3 | 22.0 ± 0.7 |
| | −10° C. | 14.3 ± 1.2 | 13.6 ± 1.2 | 16.6 ± 0.9 | 11.5 ± 3.5 |
| | +40° C. | 23.3 ± 0.7 | 19.7 ± 0.9 | 21.6 ± 0.8 | 22.9 ± 1.5 |

The invention claimed is:

1. A reactive resin mortar, comprising:
   a resin mixture, and
   an inorganic and/or organic aggregate,
   wherein the resin mixture, comprises a modified epoxy (meth)acrylate resin as the base resin, and an accelerator component, and
   wherein said resin mixture is capable of curing by a free radical peroxide initiator,
   wherein the modified epoxy (meth)acrylate resin is obtained by
   (i) reacting an organic compound having an epoxide group, with a number average molar mass $\overline{M_n}$ in the range 129 to 2400 g/mol, with (meth)acrylic acid, and
   (ii) partial esterification of a β-hydroxyl-group formed during the reaction with an anhydride of a saturated $C_3$-$C_5$-dicarboxylic acid;
   wherein the resin mixture comprises no hydroxypropyl methacrylate or other hydroxyalkyl methacrylate;
   wherein the bond strength of the reactive resin mortar having no hydroxyalkyl methacrylate is comparable to the bond strength of a reactive resin mortar having hydroxyalkyl methacrylate.

2. The reactive resin mortar according to claim 1, wherein the epoxide group-containing organic compound comprises on average two epoxide groups per molecule.

3. The reactive resin mortar according to claim 1, wherein the epoxide group is a glycidyl ether or a glycidyl ester group.

4. The reactive resin mortar according to claim 1, wherein the epoxide group-containing organic compound has an epoxy equivalent weight EEW in the range from 87 to 1600 g/eq.

5. The reactive resin mortar according to claim 1, wherein the epoxide group-containing organic compound is a diglycidyl ether of a dibasic hydroxyl-compound of the formula (I)

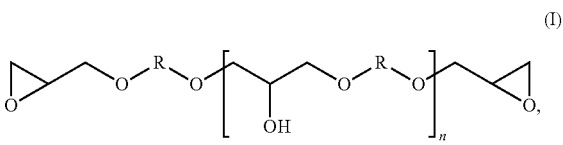

in which R is an unsubstituted or substituted aliphatic or aromatic group and the average value of n is 0 to 3.

6. The reactive resin mortar according to claim 1, wherein 0.7 to 1.2 carboxyl equivalents of (meth)acrylic acid are used per epoxide equivalent.

7. The reactive resin mortar according to claim 1, wherein, for the esterification of the β-hydroxyl-groups, between 1 and 50 mol % of anhydride of a saturated $C_3$-$C_5$-dicarboxylic acid is used per β-hydroxyl-group of the epoxy (meth)acrylate resin.

8. The reactive resin mortar according to claim 1, further comprising at least one polymerization inhibitor.

9. The reactive resin mortar according to claim 1, wherein the aggregate is selected from the group consisting of fillers and additives.

10. A two-component reactive resin mortar system, comprising: the reactive resin mortar according to claim 1, and a hardener.

11. The two-component reactive resin mortar system according to claim 10, wherein the hardener contains a free radical initiator as a curing agent, and optionally an inorganic aggregate and/or organic aggregate.

12. The reactive resin mortar according to claim 1, comprising the resin mixture in an amount of 10 to 70 wt % based on a total amount of the reactive resin mortar.

13. The reactive resin mortar according to claim 1, which has a comparable-to-slightly-higher bond strength compared to a reactive resin mortar comprising a non-modified epoxy (meth)acrylate resin instead of the modified epoxy (meth)acrylate resin.

14. The reactive resin mortar according to claim 1, which has a comparable-to-slightly-higher bond strength in comparison to a reactive resin mortar based on epoxy (meth) acrylate with hydroxyl-groups which have been partly modified with unsaturated dicarboxylic acid.

15. The reactive resin mortar according to claim 1, wherein the aggregate is present in an amount of 90 to 30 wt % based on a total amount of the reactive resin mortar.

16. The reactive resin mortar according to claim 1, wherein the inorganic and/or organic aggregate is a filler.

17. The reactive resin mortar according to claim 16, wherein the filler is at least one selected from the group consisting of quartz, glass, sand, silica sand, quartz flour, porcelain, corundum, ceramics, talc, silica, silicates, clay, titanium dioxide, chalk, heavy spar, feldspar, basalt, aluminum hydroxide, granite, sandstone, polymeric fillers, hydraulically curable fillers, metals, carbon black, wood fibers, mineral fibers, and organic fibers.

18. A method, comprising chemically fastening at least one substrate with the reactive resin mortar according to claim 1.

19. The method of claim 18, wherein chemically fastening the substrate comprises applying the reactive resin mortar into a bore hole.

20. The reactive resin mortar according to claim 1, wherein the inorganic and/or organic aggregate has a maximum particle diameter of 10 mm.

* * * * *